2,798,106

RUBBER ACCELERATORS AND METHOD OF MAKING

Alfred G. Hill, Martinsville, and Robert S. Barker, Plainfield, N. J., assignors to American Cyanamid Company, New York, N. Y., a corporation of Maine No Drawing. Application February 19, 1954, Serial No. 411,588

8 Claims. (Cl. 260—785)

This invention relates to rubber accelerator compositions. More particularly, it relates to accelerator compositions comprising heavy metal salts of 2-mercaptoarylenethiazoles and processes of preparation. Still more particularly, it relates to accelerator compositions comprising the zinc salt of 2-mercaptobenzothiazole and a process of preparation.

The addition of chemical compounds to rubber mixtures prior to vulcanization to hasten the rate of vulcanization is common practice. There are a number of types of accelerators, as these chemical compounds are known, differing in the extent to which they affect vulcanization. One of the most extensively used types of accelerator are mercaptothiazoles, particularly mercaptobenzothiazole. The accelerating action of mercaptobenzothiazole is promoted by the presence of zinc oxide. Sometimes the joint effect is obtained by employing the zinc salt of mercaptobenzothiazole.

It is necessary to prepare the zinc salt of mercaptobenzothiazole in a form suitable for incorporation into a rubber mix prior to vulcanization. In general, methods now employed for preparing zinc mercaptobenzothiazole involve the addition of a water-soluble zinc salt to a solution of the sodium salt of mercaptobenzothiazole. The resultant precipitate of zinc mercaptobenzothiazole is separated, washed, dried and milled, and offered as such to the rubber trade.

This method of preparing the zinc salt of mercaptobenzothiazole is subject to various disadvantages. One of the more important of these is the extensive washing procedure which must be practiced because of formation of by-product salts. Unless these are substantially eliminated they will form pockets in the rubber leading to subsequent cracking.

Another serious drawback to this method of preparation lies in the fact that the ultimate user, when working with latex, must further mill the zinc mercaptobenzothiazole with water into a state of fine subdivision. The resultant dispersible paste may then be added to the latex. While most of the mercaptobenzothiazole derivatives used in rubber compounding are precipitated in a state of very fine subdivision during their manufacture, they tend to form agglomerates during the drying stages. Since these derivatives generally have relatively low solubility in rubber hydrocarbons, it is necessary to grind the dried products well to obtain even dispersion of the product on incorporation in dry rubber hydrocarbons. Grinding the dried products for use in formulating non-settling dispersible pastes for ultimate use in latex compounding is a task of considerably greater difficulty.

There has remained, therefore, a need for an improved process for producing a rubber vulcanization accelerator composition comprising the zinc salt of mercaptobenzothiazole. Such a process should produce a finely divided product which may either be directly employed in latex compounding without further grinding or dried and milled for use in dry rubber compounding. The process, moreover, should be capable of producing a product free of harmful by-product impurities thereby eliminating the necessity for extensive washing. In addition the process should employ only commercially available materials and be capable of operation with a minimum of attention.

It is an object of this invention to provide such a process. In spite of the advantages of the process of this invention, it is relatively simple. Surprisingly enough, it has been found that zinc oxide and mercaptobenzothiazole, under appropriate conditions, will react to give the zinc salt of mercaptobenzothiazole. In general, the process comprises forming an aqueous slurry of zinc oxide and mercaptobenzothiazole and subjecting it to mastication until reaction is substantially complete. The resultant zinc mercaptobenzothiazole paste composition may be directly employed in latex compounding, dried and used in dry rubber compounding, or stored indefinitely in either state.

While the process has been simply stated, there are certain factors which should be noted. For instance, while the proportions of mercaptobenzothiazole and zinc oxide may be varied, they should generally be present in substantially stoichiometrically equivalent amounts. However, it is sometimes desirable to use an excess of either reactant as high as 20% to cause more complete conversion of the other reactant. As an added and important advantage of this invention, it should be noted that the starting material of the process of this invention is mercaptobenzothiazole rather than the sodium salt thereof.

Substantially stoichiometric proportions of zinc oxide and mercaptobenzothiazole are compounded and formed into an aqueous mixture. While the amount of water may be quite widely varied, there are limits in which the process is most advantageously operated. It is necessary, of course, to provide enough water to produce a paste. This amount of water will generally be at least about 20% by weight of the total weight of slurry. Larger proportions of water may be employed. Large excesses, however, should be avoided since the resultant pasty product may be too dilute in its active ingredients to be useable in rubber compounding. Additionally, such excesses will generally require the removal of too much water to be useful in making a dry product for dry rubber compounding. These factors restrict the upper limit of the water content. While it is difficult to define this limit numerically, it will, in general, be about 35 to about 65% by weight.

The resultant aqueous mixture is subjected to mastication in any suitable device. Any standard type of equipment designed to produce a high degree of shearing, grinding, or similar action may be readily employed. Mastication is continued until reaction is substantially complete. However, the period of mastication will vary to some extent with each type of equipment. While it is preferable to use a ball-mill, other common types such as an edge-runner mixer, a three-roll mill and the like serve adequately.

It has further been found in accordance with the process of this invention that the rate of conversion can be increased by conducting the reaction in the presence of a catalyst. Although conversion can be obtained without the aid of a catalyst, the rate is slow from a commercial consideration. The use of a catalyst as herein described, therefore, constitutes a preferred embodiment of this invention.

These catalysts according to the process of this invention are water-soluble acidic substances. These comprise, for instance, strong mineral acids such as hydrochloric, sulfuric, phosphoric and the like. Various organic acids such as acetic, trichloracetic, trifluoracetic and the like are also effective. These acids may be added as such or as their zinc or other hydrolyzable water soluble salts.

The amount of catalyst required to obtain the desired effect will, of course, depend on the particular catalyst added. In general, however, at least about 0.1% of the catalyst by weight of reactants should be employed.

The aqueous paste of zinc mercaptobenzothiazole produced by the above described steps may be used directly in the compounding of rubber latex without further treatment of any kind. It may be desirable, however, particularly when long periods of storage are contemplated, to add certain other ingredients to make it storage-stable. Stabilizing agents, such as clays, polyvinyl alcohol, gelatine, carboxymethyl cellulose, protein gums, and the like, for instance, may be added to decrease the settling rate of the solids and thus keep the paste in a uniform composition throughout long storage. In this way the necessity for the ultimate user to remill the paste after long periods of storage to make it homogenous is avoided.

It may also be desirable to add a dispersing agent to prevent the paste from coagulating into lumps. Such materials as aldehyde-condensed sulfonated alkyl naphthalenes, lignin sulfonic acid, dioctyl sulfosuccinate and the like may be used.

These various additional ingredients may be added conveniently to the paste after the reaction and mastication period. It is still far simpler, however, and more economical to add them prior to the mastication period. If a dry product for use in dry rubber compounding is desired, these additional ingredients need not be added. The paste of zinc mercaptobenzothiazole may simply be dried and milled in the conventional manner.

While various advantages of this invention have been noted, there is one additional advantage which bears discussion. While the instant invention involves treatment of an aqueous mixture to obtain an accelerator composition, this mixture is in the form of a millable paste. It does not involve the treatment of a solution as in preparation of zinc mercaptobenzothiazole by reacting an aqueous solution of a zinc salt with a solution of sodium mercaptobenzothiazole. Accordingly, the size of batch which can be run in any given volume is greatly increased. This, of course, is of definite economic advantage in commercial operations.

The process of this invention may be further illustrated by the following examples. All parts are by weight unless otherwise noted.

*Example 1*

45 parts of zinc oxide, 185 parts of mercaptobenzothiazole, 8 parts of a dispersing agent comprising alkylnaphthalene sulfonic acid condensed with formaldehyde, 2 parts of an inert clay as stabilizer, 1 part of zinc chloride as catalyst, and 380 parts of water are ground in a ball-mill until conversion to zinc mercaptobenzothiazole is substantially complete. Resultant zinc mercaptobenzothiazole composition as a 37% aqueous paste can be used directly in rubber latex compounding without further treatment of any kind.

*Example 2*

The procedure of Example 1 is repeated using, however, 2 parts of bentonite as the stabilizing agent and 8 parts of lignin sulfonic acid for dispersion. Resultant zinc mercaptobenzothiazole composition can be used directly in rubber latex compounding without further treatment of any kind.

*Example 3*

54 parts of zinc oxide, 185 parts of mercaptobenzothiazole, 10 parts of dioctyl sulfosuccinate as dispersing agent, and 60 parts of water are ground in a ball-mill until conversion is substantially complete. The resultant paste may be used directly in rubber latex compounding without further treatment. Alternatively, it may be dried by conventional methods and the resultant powder used directly, after simple milling, in ordinary dry rubber compounding. If it is desired to store the initial zinc mercaptobenzothiazole paste as such it can be further ground with 2 parts of carboxymethyl cellulose as a stabilizing agent, or the latter may be added to the original aqueous mix. In this manner a storage-stable paste is obtained.

*Example 4*

Separate runs were conducted following the procedure of Example 1, but replacing zinc chloride with like amounts of hydrochloric acid, sulfuric acid, and trichloroacetic acid as catalyst. The zinc mercaptobenzothiazole paste obtained in each of these runs is similar to that obtained in Example 1 and may be used directly in rubber latex compounding without further treatment.

*Example 5*

A mixture of 45 parts of zinc oxide, 222 parts of mercaptobenzothiazole, and 222 parts of water is masticated in an edge-runner mixer until conversion to zinc mercaptobenzothiazole is substantially complete. The zinc mercaptobenzothiazole paste obtained is similar to that in Example 1 and may be used in any of the ways suggested in Example 3.

We claim:

1. A process according to claim 7 in which at least 0.1% by weight of a catalyst is present in the mixture.
2. A process according to claim 1 in which the catalyst is a water-soluble acidic compound.
3. A process according to claim 1 in which the catalyst is a strong mineral acid.
4. A process according to claim 1 in which the catalyst is an organic acid.
5. A process according to claim 1 in which the catalyst is zinc chloride.
6. A rubber vulcanization accelerator composition for use in latex compounding comprising an aqueous paste of zinc mercaptobenzothiazole, zinc oxide and mercaptobenzothiazole in substantial chemical equilibrium, the water content being from about 20% to about 65% by weight.
7. A process of preparing a rubber vulcanization accelerator composition in the form of an aqueous paste for addition to latex whereby a coagulation stable latex-accelerator composition may be formed, said accelerator composition comprising zinc mercaptobenzothiazole, zinc oxide and mercaptobenzothiazole in substantial chemical equilibrium which comprises: preparing an aqueous mixture comprising mercaptobenzothiazole and zinc oxide in substantially stoichiometric proportions, said mixture being free of other rubber compounding ingredients and the water content thereof being from about 20% to about 65% by weight, and masticating said slurry until conversion to zinc mercaptobenzothiazole is complete and particle size is sufficiently small to permit ready dispersion into latex.
8. A process according to claim 7 in which the aqueous mixture of zinc oxide and mercaptobenzothiazole comprises, in addition, a stabilizing agent and a dispersing agent to decrease the settling rate and coagulation, respectively, of solids on storage of the resultant aqueous zinc mercaptobenzothiazole paste.

References Cited in the file of this patent

UNITED STATES PATENTS

| | | |
|---|---|---|
| 1,544,687 | Sebrell et al. | July 7, 1925 |
| 2,170,670 | Williams et al. | Aug. 22, 1939 |
| 2,356,932 | Jones et al. | Aug. 29, 1944 |

OTHER REFERENCES

The Rubber Age, article by O'Connor et al., volume 54, No. 5, pages 423–427.